J. F. DICKERSON.
BRAKE HINGE.
APPLICATION FILED MAR. 4, 1915.

1,163,324.

Patented Dec. 7, 1915.

Witnesses
H. W. Burton
M. Tobias

Inventor
John F. Dickerson
By W. W. Williamson
Attorneys

UNITED STATES PATENT OFFICE.

JOHN F. DICKERSON, OF SNOWDEN, WASHINGTON.

BRAKE-HINGE.

1,163,324.  Specification of Letters Patent.  Patented Dec. 7, 1915.

Application filed March 4, 1915. Serial No. 12,002.

*To all whom it may concern:*

Be it known that I, JOHN F. DICKERSON, a citizen of the United States, residing at Snowden, in the county of Klickitat and State of Washington, have invented new and useful Improvements in Brake-Hinges, of which the following is a specification.

My invention relates to new and useful improvements in brake hinges, and has for its object to provide an exceedingly simple and effective device of this character which may be used with brakes of any preferred form of construction which will be relatively inexpensive in the cost of manufacture and which may be readily and quickly repaired at very little expense.

A further object of the invention is to provide a brake hinge which will not rattle when the vehicle to which it is attached is in motion, thus overcoming a very serious objection to most of the brake hinges now in use.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this specification, in which—

Figure 1:
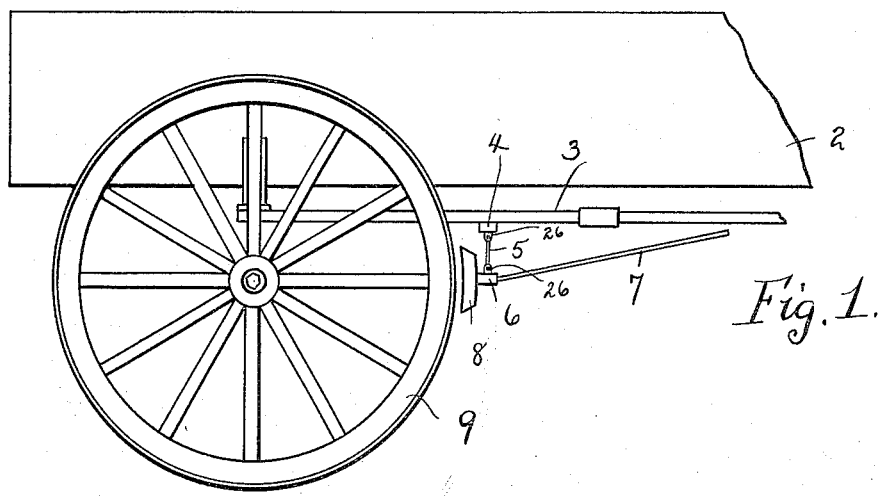
Figure 2:
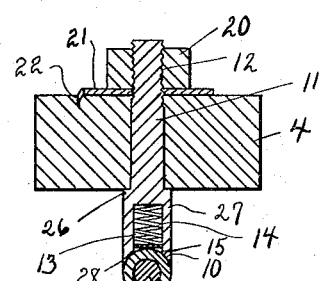
Figure 3:
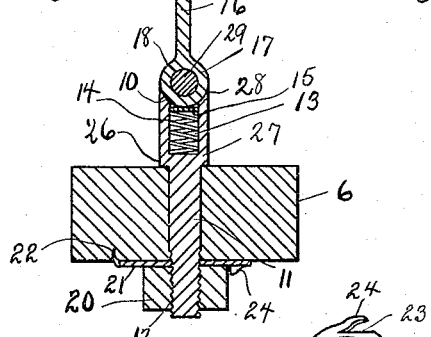
Figure 4:
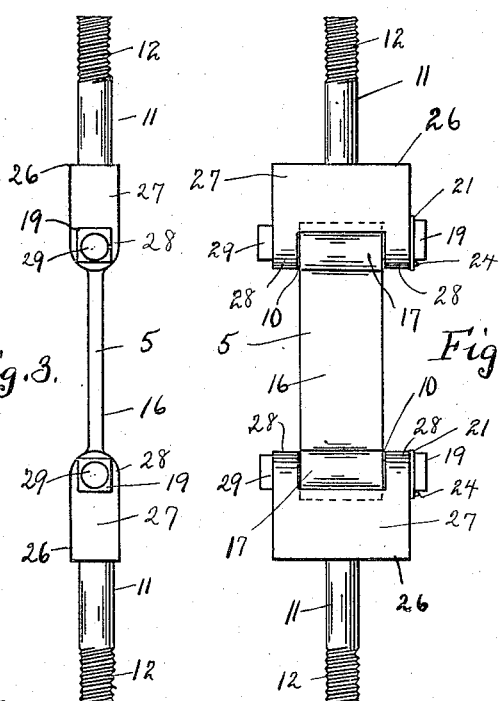
Figure 5:
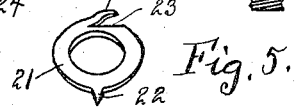

Figure 1, is a side elevation of the rear portion of a vehicle showing my improvement applied thereto. Fig. 2, is an enlarged sectional view of the brake hinge showing it attached to the brake beams. Fig. 3, is an edge view of the brake hinge removed from the beams. Fig. 4, is a side elevation thereof; and Fig. 5, is a perspective view of the nut locking washer used to prevent the accidental displacement of the nuts.

In carrying out my invention as here embodied 2 represents a vehicle of any desirable construction here shown as a wagon to the hounds 3 of which is secured the stationary brake beam 4 having one of my hinges 5 secured thereto adjacent each end, said hinges also being fastened to the movable brake beam 6 operated in any suitable manner such as by a brake lever 7. To each end of the movable brake beam 6 is secured a brake shoe 8 adapted to coact with the wheels 9 of the vehicle.

My improved brake hinge consists of two end forks 26 oppositely disposed and projecting in opposite directions. Each end fork 26 comprises a body 27, spaced arms 28 having bolt openings therein, leaving a cavity or chamber 10 therebetween, and a shank 11 threaded at the outer end as indicated by 12.

In the body 27 is formed a spring chamber 13 having an outlet in communication with the cavity or chamber 10, and in the spring chamber is mounted a helical spring 14, one end thereof resting against the inner wall of the spring chamber as the stationary point, and the other end resting against a disk 15 as the movable point so that said disk is normally forced outward. Between the end forks is mounted the connecting leaf 16 provided at each end with an enlargement 17 in cross section and having bolt openings 18 therethrough. Said connecting leaf is held in place in the end forks by means of the bolts 29 which pass through the bolt openings in the arms 28 and the enlargements 17, said bolts having threaded on their outer ends the nuts 19 for holding the parts in position. The brake hinge is secured to the brake beams by passing the shanks 11 through said brake beams and there held in place by the nuts 20 threaded on the ends of said shanks. The springs 14 force the disk 15 outward, producing a friction upon the arcuate enlarged ends of the connecting leaf 16, so that the parts are prevented from rattling.

Where a nut is used for holding the parts together, I prefer to use a locking washer illustrated in Fig. 5 and consisting of the washer 21 provided with a depending prong 22 and slit as at 23, leaving a tongue 24 which is bent upward, so that it lies above the face of the washer, and said tongue is adapted to engage one of the sides of the nut after the same has been forced home, thus preventing any retrograde movement of said nut, the washer being held against movement by embedding the prong 22 into the object against which the nut is to be placed.

Of course I do not wish to be limited to the exact details of construction as here shown, as these may be varied within the limits of the appended claims without departing from the spirit of my invention.

Having thus fully described my invention, what I claim as new and useful, is—

1. In an anti-rattling brake hinge two end forks each provided with a spring chamber, a connecting leaf pivoted to said end forks, a disk mounted in each of the spring cavities or chambers, and a spring also mounted in each of said spring chambers for normally holding the disks in contact with the ends of the connecting leaf for producing friction thereon.

2. In an anti-rattling brake hinge a pair of oppositely disposed end forks, each comprising a body having a spring chamber therein, a pair of spaced arms having bolt openings therein producing a chamber between said arms and a threaded shank, a connecting leaf, means passing through the bolt openings in the arms and through the ends of the connecting leaf for attaching said connecting leaf to the end forks and resilient means mounted within the spring chambers for producing friction upon the connecting leaf.

3. In an anti-rattling brake hinge a pair of oppositely disposed end forks, each comprising a body having a spring chamber therein, a pair of spaced arms having bolt openings therein producing a chamber between said arms and a threaded shank, a connecting leaf having enlarged ends arcuate in cross section and provided with bolt openings passing through the openings in the arms, and through the ends of the connecting leaf for attaching said connecting leaf to the end forks, nuts mounted on the ends of said bolts, a disk mounted within each of the spring chambers and engaging the arcuate enlarged ends of the connecting leaf, and springs situated within the spring chambers for normally holding said disks in contact with the ends of the connecting leaf to produce friction thereon.

4. In a device of the character stated the combination with brake beams of two end forks each comprising a body, a pair of spaced arms and a shank, said shank mounted in the brake beams, nuts threaded on said shanks, a connecting leaf having each end mounted between the spaced arms of an end fork, bolts for attaching the connecting leaf to the end forks, a disk mounted in a chamber in each of the end forks, and springs for normally holding said disks in contact with the ends of the connecting leaf, whereby any lost motion is compensated for.

In testimony whereof, I have hereunto affixed my signature in the presence of two subscribing witnesses.

JOHN F. DICKERSON.

Witnesses:
C. H. Estes,
Donnie Rainey.